E. R. KNOTT.
MACHINE FOR CUTTING AND WRAPPING CANDY KISSES, &c.
APPLICATION FILED JAN. 10, 1910.
1,025,069.
Patented Apr. 30, 1912.
4 SHEETS—SHEET 1.
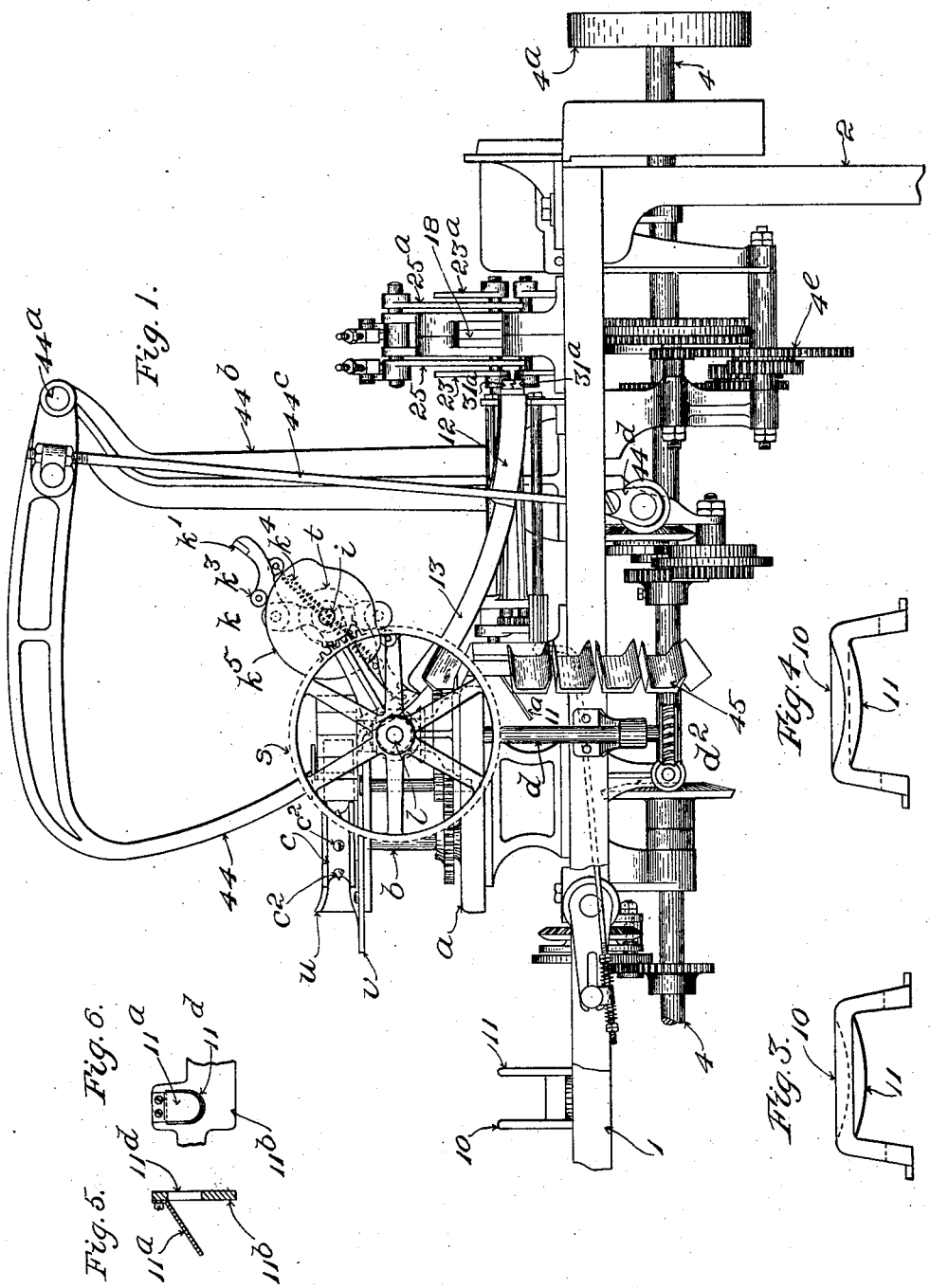
Witnesses:
Oscar F. Hill
Edith J. Anderson
Inventor:
Eustace R. Knott
by Chas. F. Randall
Attorney.

E. R. KNOTT.
MACHINE FOR CUTTING AND WRAPPING CANDY KISSES, &c.
APPLICATION FILED JAN. 10, 1910.
1,025,069.
Patented Apr. 30, 1912.
4 SHEETS—SHEET 2.
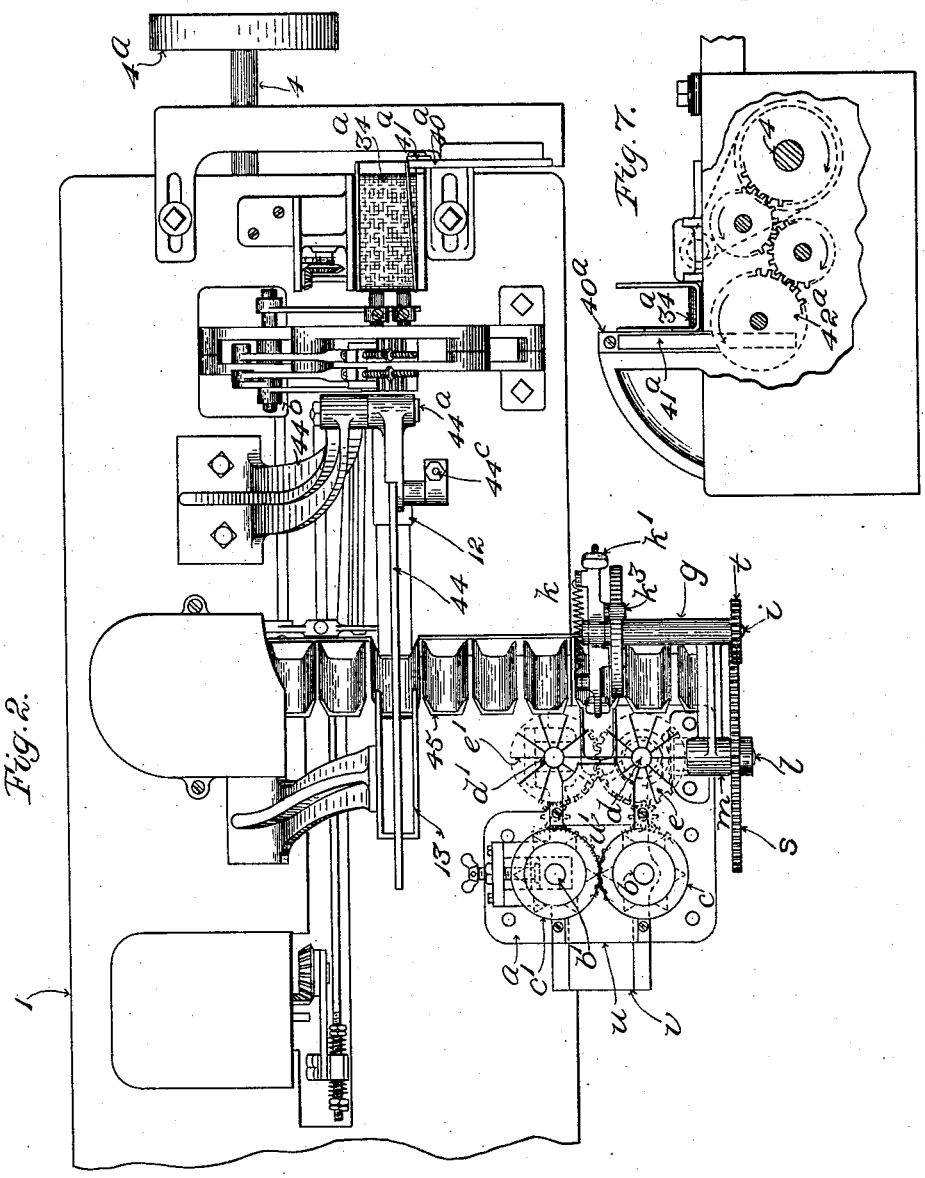

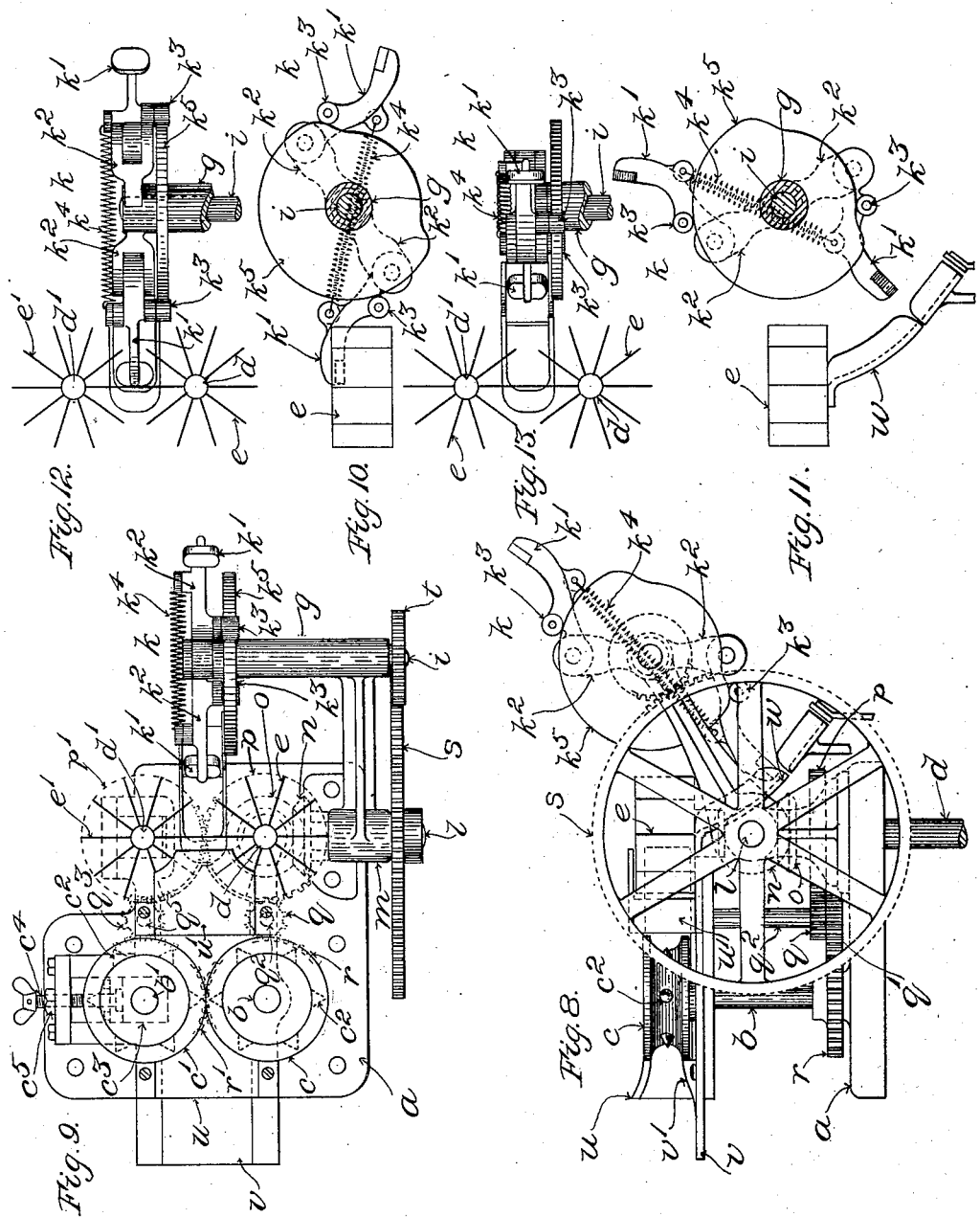

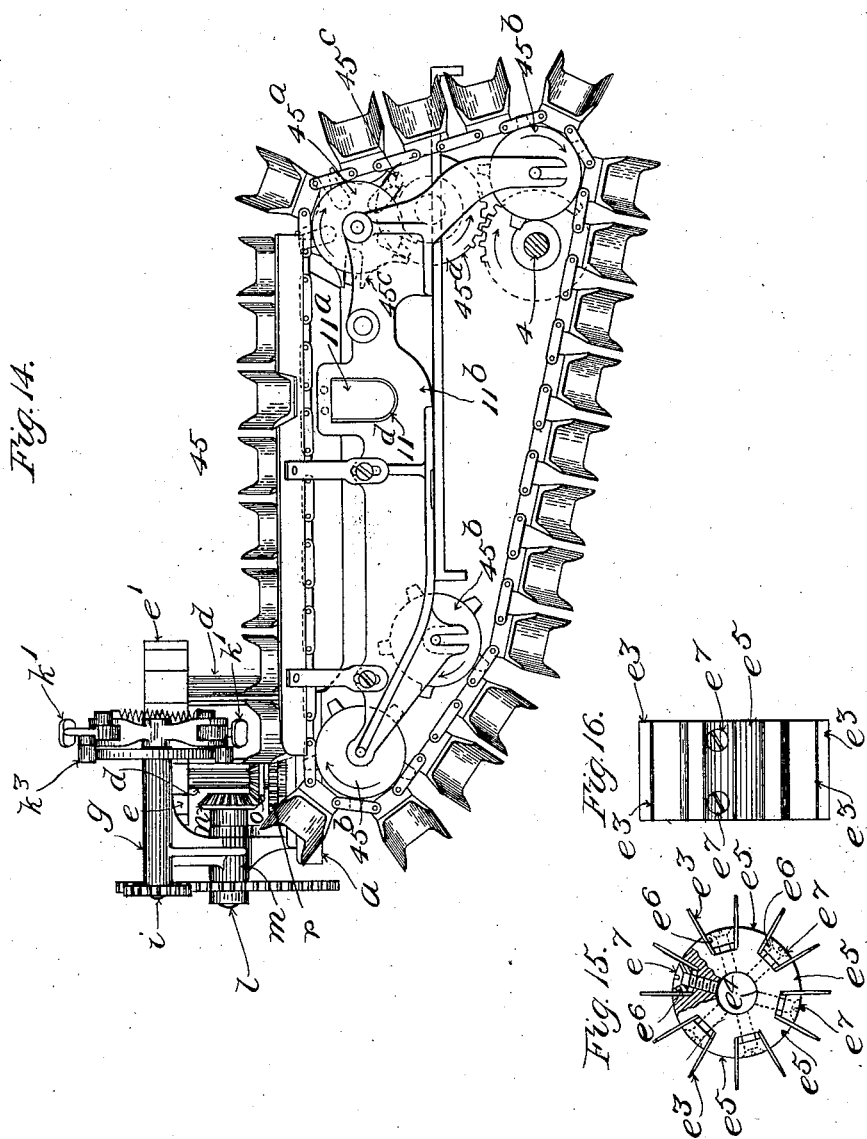

UNITED STATES PATENT OFFICE.

EUSTACE R. KNOTT, OF SHARON, MASSACHUSETTS, ASSIGNOR TO E. R. KNOTT MACHINE COMPANY, OF BOSTON, MASSACHUSETTS, A CORPORATION OF MASSACHUSETTS.

MACHINE FOR CUTTING AND WRAPPING CANDY KISSES, &c.

1,025,069. Specification of Letters Patent. Patented Apr. 30, 1912.

Application filed January 10, 1910. Serial No. 537,117.

*To all whom it may concern:*

Be it known that I, EUSTACE R. KNOTT, a citizen of the United States, residing at Sharon, in the county of Norfolk, State of Massachusetts, have invented a certain new and useful Improvement in Machines for Cutting and Wrapping Candy Kisses, &c., of which the following is a specification, reference being had therein to the accompanying drawings.

The invention employs preferably a rotary cutting device by which a drawn-out batch of candy is cut up into pieces, and it provides also for supplying such pieces automatically to the wrapping instrumentalities whereby they are inclosed in wrappers. It includes a species of feeder which is arranged to rotate, it having one or more fingers operating respectively by engagement with the successive pieces of candy to advance a piece to the required point and then withdraw by a retracting movement from such piece so as to leave the latter in the desired position, undisturbed by the continued rotary travel of the finger. This rotary feeder is adapted for employment in connection with a traveling conveyer which supplies the pieces to the wrapping instrumentalities, by the feeder being arranged to deliver the successive pieces to the conveyer, though it is not necessarily restricted to use in such precise connection. It also is adapted to be employed as a clearer or stripper for the rotary cutting device, although it is not necessarily restricted to such employment. When the device in question is employed as a feeder, simply, it is not in all cases essential that the cutting device employed should be a rotary device, or even that a cutting device should be employed as a part of the same machine. By the employment of batch-sizing devices in advance of the cutting device, I am enabled to size the batch, cut it into pieces, deliver the latter successively to the wrapping instrumentalities, and wrap them.

An embodiment of the different features of the invention is represented in the drawings, in which latter,—

Figure 1 shows in side elevation a portion of a machine containing the said embodiment. Fig. 2, Sheet 2, is a plan view of the main parts of such machine. Fig. 3, Sheet 1, is a rear view of the supporting guide and first breaker for the wrapping material, and Fig. 4 is a front view thereof. Fig. 5, Sheet 1, is a view of the second breaker in vertical section, and Fig. 6 is a front view thereof. Fig. 7, Sheet 2, is a view of the delivery end of the machine partly broken away. Fig. 8, Sheet 3, shows the sizing, cutting, and delivering devices in side elevation. Fig. 9, same sheet, shows the same in plan. Figs. 10 and 11 are detail views of the delivering devices showing the parts in different positions. Figs. 12 and 13 are plan views of the parts in positions in which they are shown in Figs. 10 and 11, respectively. Fig. 14, Sheet 4, is a front elevation of the parts shown in Figs. 8 to 13, with the addition of the transverse conveyer. Fig. 15, Sheet 4, is a top view of a cutter-roll, illustrating the detachability of the blades thereof, portions being broken away. Fig. 16 is a side elevation of such cutter-roll.

The drawings show a construction of wrapping mechanism which may conveniently be employed. The invention is not restricted to the employment of this particular mechanism. The following brief description thereof, taken in connection with the description of the preferred embodiment of the different features in which the invention more immediately resides, will be sufficient to render clear to those skilled in the art the best mode in which I have thus far contemplated carrying the invention into effect.

The features of the wrapping mechanism or devices shown in the drawings are as follows:

1 is the bed or table of the machine, and 2, Fig. 1, is one of the upright supports for the said bed or table.

4 is the driving shaft extending lengthwise of the machine, and 4ª is a band-pulley upon the said shaft for the reception of a suitable driving-band by which the machine may be driven. The various working parts of the machine are operatively connected with the said shaft and thereby are actuated.

The wrapping material (paper) in the form of a continuous strip is led into the wrapping mechanism over the supporting-guide 10, Figs. 1, 2 and 3, and then under the convex under surface of the first breaker 11, by which latter the strip is given a transverse curvature with its side-portions upturned. After passing the first breaker the strip proceeds to the second breaker 11ª, Figs. 1, 5, 6 and 14, the latter breaker having an acting portion in the shape of a tongue inclining downwardly and toward the supply-end of the machine. The second breaker is supported by means of stand 11ᵇ, Fig. 14, and it constitutes an inside guide and former by means of which the transverse curvature of the strip of wrapping material is increased while the side-portions thereof are allowed to approach each other more closely and occupy nearly upright positions. After passing the second breaker the trough-shaped strip passes through the opening 11ᵈ of the stand 11ᵇ, the surrounding wall of such opening constituting an outside guide for the strip. From the outside guide 11ᵇ the trough-shaped strip passes to the folder 12, Figs. 1 and 2, the latter being constructed to cause the side-portions of the strip to overlap each other, and having a central passageway therethrough of a cross-section suited in its proportions to the size of the pieces of candy to be wrapped. The said pieces are caused to pass successively through the passageway by means of the pusher 44, Figs. 1 and 2, which is mounted pivotally at 44ª upon an upright or standard 44ᵇ fixed upon bed or table 1, the said pusher being connected by rod 44ᶜ to a rotating crank 44ᵈ, Fig. 1, which is gear-driven from the shaft 1. The said pusher operates to push each piece of candy in turn along a chute 13, into and through the passageway of the folder 12, and deliver it within the tubularly folded or formed strip of wrapping material beyond the forward end of the folder. The twister is located at 18, Fig. 1. The folded or tubularly-formed strip of wrapping material passes through the center thereof. By the advancing movement of the feeder-arm 44 a piece of candy which is pushed forward thereby inside the said tubularly formed or folded strip of wrapping material is caused to assume a position therein within the twister. For the purposes of the twisting, the twister is in gear-connection by means of the gears 4ᵉ, Fig. 1, with the shaft 4, and by the rotation of the twister the required turns or twists are produced in the wrapping material at opposite sides of the piece of candy which is inclosed therein.

23 and 23ª are nippers at the opposite sides of the twister, which clamp the wrapping material for the purpose of locating or confining, close to the opposite ends of the piece of candy that is being enwrapped, the twists that are communicated to the tube of wrapping material by the rotary movement of the twister.

25, 25ª, are crimper-members which are also located at opposite sides of the twister and arranged to engage with the marginal portions of the flattened tube of wrapping material and press the said marginal portions toward the center, crimping or bunching the material closely together at the place where the twists are to be produced therein, the purpose being to obviate tendency of the marginal portions aforesaid to become torn between the twister and the nippers or clamps 23, 23ª, by the strain on such marginal portions in beginning the twisting.

At 31ª, 31ª, are grippers by which the enwrapped article is advanced beyond the twister after the wrapping material has been twisted at front and rear thereof. In operation, these grippers are caused to close upon the tube of wrapping material at the rear of the said enwrapped article, at the supply-side of the twister, and then are advanced through the twister, pushing the enwrapped article ahead and drawing along the strip of wrapping material through the machine in readiness for wrapping the next piece of candy. After opening so as to release their hold upon the tube of wrapping material at the end of the advancing or feeding movement, the feeding grippers are withdrawn in the reverse direction through the twister to their starting position, where they remain in an open condition until it is time to perform the next feeding action.

At 34ª, Figs. 2 and 7, is a continuously-moving endless apron at the delivery side of the twister, upon which is received the enwrapped article which has been advanced through and beyond the twister by the feeding movement of the feeding grippers. The said moving apron insures that the said article shall advance to the full extent between and beyond the fixed cutter-blade 40ª, Figs. 2 and 7, and the moving cutting-blade 41ª. The fixed blade 40ª is arranged in an upright position at one side of the path of the advancing enwrapped article, and the moving blade 41ª is carried by a spur-gear 42ª which is in gear-connection with the driving-shaft 4 and thereby rotated.

Having reference now to the sizing and cutting devices, such devices are mounted in a supplemental framework $a$ which is supported upon and above the bed or table 1. The sizing device comprises essentially the pair of sizing rolls $c$, $c'$. The cutting device comprises essentially a pair of rotary cutters $e$, $e'$. The framework $a$ is provided with bearings in which are mounted the two shafts $b$, $b'$, upon which the pair of sizing-rolls $c$, $c'$, are fixed. The said shafts are in this instance parallel with each other, and vertical, which I prefer, although I do not in all cases restrict myself in these respects. The said framework is provided also with bearings in which are mounted the second pair of shafts $d$, $d'$, upon which the pair of rotary cutters $e$, $e'$, are fixed.

The said shafts $d$, $d'$, also are parallel with each other, and vertical, although I do not limit myself to a strictly parallel or vertical arrangement. The sizing-rolls $c$, $c'$, and cutters $e$, $e'$, are mounted upon the upper ends of their respective shafts above the upper horizontal portion of the framework $a$, the bearings of the shafts being below the rolls and cutters to afford convenient access to the rolls and cutters and to the candy passing between them. The frame $a$ also is provided at the front thereof with a bearing at $g$, Figs. 2, 9 and 14, in which is mounted the shaft $i$, Figs. 11 to 14, of the fly $k$. The shaft $i$ is horizontal, and hence the fingers of the fly rotate in a vertical plane.

The sizing and cutting devices are actuated as follows: Shaft $d$ of the cutter-roll $e$ is extended downward, and operatively combined through intermediate gearing, etc., at $d^2$, Fig. 1, with shaft 4. Thereby the said shaft $d$ and its cutter $e$ are rotated. Spur-gears $p$, $p'$, Figs. 8 and 9 on the respective shafts $d$, $d'$, mesh with each other, and through them motion is transmitted to the shaft $d'$ so as to drive the cutter $e'$ and thus cause the two cutters to rotate in unison. Separate trains of gear-connections lead to the respective shafts $b$, $b'$, of the sizing-rolls $c$, $c'$, whereby the said sizing-rolls are rotated. Such separate trains of gear-connections comprise in the case of roll $c$ the spur-gear $p$, the pair of carrier spur-pinions $q$, $q'$, connected together, and the spur-gear $r$ fixed on shaft $b$ of roll $c$. The carrier spur-pinions $q$, $q'$, are shown fixed upon a separate shaft $q^2$ mounted in bearings in the frame $a$. The pinion $q$ is in mesh with the spur-gear $p$, and pinion $q'$ is in mesh with spur-gear $r$. The gear-connections in the case of roll $c'$ comprise spur-gear $p'$, a pair of carrier spur-pinions $q^3$, (similar to $q$, $q'$) connected together, and the spur-gear $r'$ fixed on shaft $b'$ of roll $c'$. The carrier spur-pinions $q^3$ are fixed upon the shaft $q^5$, mounted in bearings in frame $a$.

The fly $k$ is rotated by means of a spur-gear $s$ fixed on the horizontal shaft $l$ and meshing with a spur-pinion $t$ fixed on fly-shaft $i$, shaft $l$ being driven from shaft $d$ by bevel-gearing $n$, Figs. 8, 9 and 14, the gearing being so proportioned that a finger of the fly shall pass down within each opening in succession between the registering blades of the cutters as the latter rotate.

The sizing rolls $c$, $c'$, are made with concave peripheries to receive a roll or strip of candy, shape or form the same somewhat, and reduce it to a uniform diameter. The said peripheries are furnished with pointed spurs $c^2$, $c^2$. These engage with the roll or strip and operate to positively advance it. They also punch holes in the roll or strip, permitting any confined air to escape, which obviates a tendency of such air to be crowded back by the action of the sizing rolls into bubbles at the entering side of the rolls. At $u$ is an arched guide located at the entering side of the rolls and having a flaring entrance. A somewhat similar guide or arch $u'$, Figs. 2, 8, 9, is located between the sizing rolls $c$, $c'$, and the cutters $e$, $e'$. The cutting-blades of the cutters are disposed radially. A guide-plate $v$ extends from in front of the arched guide $u$ through into proximity to the cutters, and an extension $w$ thereof, Figs. 8 and 12, constitutes an apron or chute extending down and forward in front of the cutters and below the fly. The said guide-plate $v$ has an elevated portion $v'$, Fig. 8, in front of the entrance between the sizing rolls $c$, $c'$, such portion serving to uphold the candy above the lower rims of such rolls, and the said elevated portion and the top portion of the arch $u$ serving to insure that the candy shall be received entirely within the concavities of the rolls. The portion of the said guide plate $v$ that is adjacent the entrance between the cutter rolls is elevated sufficiently with respect to the lower ends of the cutter-blades to lift the candy above such ends, while the guide $u'$ prevents the candy from rising above the upper ends of the cutter-blades. The apron or chute $w$ has raised side-flanges, as shown, which prevent the pieces of candy from scattering laterally. Its upper end extends back in under the lower ends of the cutters to practically the point at which the blades of the two rotary cutters come together or meet, so as to leave the pieces of candy free to drop as soon as they are struck down by the fingers of the fly. The apron or chute partially covers the spur-gears $p$, $p'$, and prevents the pieces of candy from falling upon the same.

For the purpose of enabling the sizes of the pieces of candy to be varied, the bearings $c^3$, Fig. 9, of the shaft $b'$ of sizing-roll $c'$ are made adjustable transversely. This enables the said shaft and sizing-roll to be shifted toward and from the other sizing-roll, to vary the closeness of approach of one sizing-roll to the other. By thus varying the said closeness of approach, the size of the roll or strip of candy as it passes between the sizing-rolls is correspondingly varied. The said bearings $c^3$ work in openings in the frame $a$, and for convenience in adjusting them they are provided with adjusting screws $c^4$ provided with lock-nuts $c^5$.

The fingers of the fly strike down the pieces of candy from the openings between the blades of the cutter-rolls and deliver the successive pieces of candy into the successive buckets of the transverse conveyer-chain 45. The latter passes around sprocket-wheels $45^a$, $45^b$, etc., Fig. 14, the wheel $45^a$ being the driver and being actuated to advance the conveyer-chain intermittingly by the pin-and-star wheel devices 45$^c$ actuated by gearing 45$^d$ from the shaft 4. To secure the said delivery, the cutting devices are located in such position that the apron or chute $w$ terminates alongside the outer portion of the said conveyer-chain, the said apron or chute being located in line with the stopping position of one of the buckets of the conveyer-chain. During a dwell of the chain in the working of the machine, a piece of candy is delivered by a finger of the fly into the bucket which is in line with the said apron or chute. The ensuing advance of the chain brings the next bucket into position to receive the succeeding piece of candy, and so on, each bucket receiving a piece in like manner, and the feed movements of the conveyer-chain serving to advance the pieces thus received into position to be pushed successively by the feeder-arm 44 through the folder and into position within the folded tube of wrapping material inside the twister. The fingers $k'$, $k'$, of the fly (see, more particularly, Figs. 8 to 14) are contrived and operated so that as one of such arms, after striking and following down a piece of candy from between the cutters, arrives at the lower end of chute or apron $w$ it shall recede or withdraw entirely clear of the said piece when received within the bucket in line with said chute, leaving the piece within the said bucket. To this end, each finger of the fly is connected pivotally by its inner end with the outer end of an arm $k^2$ which is rigidly connected to the fly-shaft. Each finger of the fly is furnished with a pin or anti-friction roll $k^3$, and the two fingers are connected together by means of a contracting spiral spring $k^4$ which operates to draw the said fingers inwardly toward each other, causing them to turn upon their pivots. Thereby the said pins or anti-friction rolls are kept pressed into contact with the periphery of a stationary cam $k^5$ upon the inner end of the bearing $g$ for the fly-shaft. As the fly-shaft rotates, carrying the fingers of the fly around, the pins or anti-friction rolls travel upon the peripheral surface of the stationary cam. The portions of greater radius of the said cam operate to hold the fingers swung outward from the center of rotation. The portions of less radius allow the fingers to occupy positions nearer the center of rotation. One of the grades connecting the peripheral portion of greater throw with the peripheral portion of less throw is so located that after a fully-projected finger has descended between the blades of the rotary cutters as in Figs. 10 and 12, and has approached closely to the entrance of the bucket which is in position at the lower end of the apron or chute, the pin or anti-friction roll of such finger shall pass to the peripheral portion of less radius or throw of the cam, permitting the spring $k^4$ to swing the finger backward and inward, as in Figs. 11 and 13, withdrawing it from the bucket referred to, and from the piece of candy which has been deposited therein. Thus the working extremity of each finger of the fly in succession is caused to withdraw and clear the bucket and the piece of candy which has been received therein. As roll $k^3$ travels upon the concentric portion of least radius, the working end of the finger remains in its retracted position, so that it passes above the piece without disturbing it. An oppositely-located cam-grade acts against the roll $k^3$ to move the finger out into its normal working position again as the fly rotates, and the concentric portion of greatest radius of the cam holds the finger out in such position until after its working end has passed around between the cutters, and through chute $w$, to the conveyer again. The number of fingers with which the fly is provided is not material to the invention.

The cutters $e$, $e'$, are shown conventionally in Figs. 2, 9, 12 and 13. The construction providing for convenient attachment and removal of the cutter-blades $e^3$, $e^3$, is shown in detail in Figs. 15 and 16, Sheet 4. In the latter figures the cylindrical body $e^4$ of a cutter is shown formed with radiating ribs $e^5$, $e^5$, etc., each corresponding in thickness with the interval between two adjacent blades, the said body being formed with longitudinal grooves between such ribs. The grooves are occupied by the inner edges of the blades $e^3$, $e^3$, etc., and the clamping blocks $e^6$, $e^6$, etc. The said grooves and blocks are tapered in cross-section, and the blocks are secured in place and caused to clamp the blades against the ribs by means of radially-disposed screws $e^7$, $e^7$, etc., the threaded stems of which enter threaded holes that are tapped in the body $e^4$. On tightening up the screws the blocks are drawn inward into the grooves, to thus clamp and secure the blades. On loosening the screws the blocks are permitted to move outward so as to unclamp the blades and permit them to be removed and replaced. Preferably a single block and two blades are placed within each groove, one blade at each side of the block, both blades being secured in place by the block.

What is claimed is:—

1. The combination with a cutting device, wrapping mechanism, and a conveyer by which pieces of candy from the said device are transferred to the said mechanism to be wrapped, of a fly coacting with the cutting device and delivering to the said conveyer.

2. The combination with a cutting device, wrapping mechanism, and a conveyer traveling below such device and by which pieces of candy supplied by the said device are transferred to the said mechanism to be wrapped, of a fly working downwardly and delivering from the cutting device to the said conveyer.

3. The combination with a rotary cutting device, a conveyer having buckets, and wrapping mechanism to which the contents of the buckets are delivered in turn to be successively wrapped, of a rotating fly having fingers which work in the openings between the cutter-blades and feed the cut pieces into the successive pockets of the conveyer.

4. The combination with wrapping mechanism, a moving conveyer delivering to the said mechanism pieces of candy to be wrapped, and a device by which candy is cut into pieces, of a rotating carrier having a finger working between the said device and said conveyer which engages with the said pieces and delivers them to the conveyer, and means to cause a retracting movement of such finger to clear the pieces received by the conveyer.

5. The combination with wrapping mechanism, and a conveyer having buckets, of a rotating carrier having a finger by which articles are fed into such buckets, and means to cause such finger to retract on arriving at the buckets, clear of the contents thereof.

6. The combination with a conveyer having buckets, and a cutting device, of a rotating fly coöperating with such cutting device and also delivering the pieces cut thereby to the said buckets, said fly having a finger which engages with the pieces, and means to cause the finger to retract on arriving at the buckets, clear of the contents of the latter.

7. In combination, wrapping mechanism, a conveyer, a rotating carrier, a finger movably connected thereto, and means to cause said finger to alternately project into working position, and then retract.

8. In combination, wrapping mechanism, a conveyer, a rotating carrier, a finger movably connected thereto, and a cam controlling the said finger to cause the same to alternately project into working position and retract as the fly rotates.

9. In combination, wrapping mechanism, a conveyer, a rotating carrier, a finger connected therewith, and a fixed cam controlling the said finger to cause the same alternately to project for action and to retract.

10. In combination, a rotary cutting device, a conveyer, and a fly comprising a rotary carrier, a finger movably connected therewith, and a cam controlling the said finger to cause the same to project so as to work in the intervals between cutting blades and then withdraw or retract to clear the conveyer and the piece that has been delivered thereto.

11. The combination with wrapping mechanism, and a moving conveyer, of a rotating carrier having a finger by which in the rotation of the carrier an article is engaged and moved onto the said conveyer, and means to cause such finger to retract clear of the said article leaving the latter in place on the conveyer.

In testimony whereof I affix my signature in presence of two witnesses.

EUSTACE R. KNOTT.

Witnesses:
   CHAS. F. RANDALL,
   EDITH J. ANDERSON.

---

Copies of this patent may be obtained for five cents each, by addressing the "Commissioner of Patents. Washington, D. C."